United States Patent
Hosseinian et al.

(10) Patent No.: US 12,519,576 B2
(45) Date of Patent: Jan. 6, 2026

(54) WIRELESS TRANSMISSIONS WITH HYBRID AUTOMATIC REPEAT REQUEST (HARQ) FEEDBACK DISABLED

(71) Applicant: Samsung Electronics Co., Ltd., Suwon-si (KR)

(72) Inventors: Seyed Mohsen Hosseinian, San Diego, CA (US); Philippe Sartori, Naperville, IL (US); Hamid Saber, San Diego, CA (US); Jung Hyun Bae, San Diego, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 351 days.

(21) Appl. No.: 17/672,642

(22) Filed: Feb. 15, 2022

(65) Prior Publication Data

US 2022/0303065 A1  Sep. 22, 2022

Related U.S. Application Data

(60) Provisional application No. 63/163,578, filed on Mar. 19, 2021.

(51) Int. Cl.
*H04L 1/1829* (2023.01)
*H04L 1/1812* (2023.01)
*H04W 72/23* (2023.01)

(52) U.S. Cl.
CPC .......... *H04L 1/1861* (2013.01); *H04L 1/1812* (2013.01); *H04W 72/23* (2023.01)

(58) Field of Classification Search
CPC ... H04L 1/1607; H04L 1/1812; H04L 1/1816; H04L 1/1854; H04L 1/1861;
(Continued)

(56) References Cited

U.S. PATENT DOCUMENTS

| | | | |
|---|---|---|---|
| 10,342,005 B2 * | 7/2019 | Song | H04L 5/0094 |
| 10,404,438 B2 * | 9/2019 | Park | H04L 1/1887 |

(Continued)

FOREIGN PATENT DOCUMENTS

| | | | | |
|---|---|---|---|---|
| BR | 112021003043 A2 * | 5/2021 | | H04L 1/1819 |
| CA | 3061750 C * | 7/2020 | | H04L 5/0007 |

(Continued)

OTHER PUBLICATIONS

Huawei et al., Discussion on HARQ enhancement for NTN, Oct. 26, 2020, 3GPP TSG RAN WG1 Meeting #103-e, E-meeting, Agenda Item: 8.4.3, Tdoc: R1-2007571 (Year: 2020).*

(Continued)

*Primary Examiner* — Eric Nowlin
(74) *Attorney, Agent, or Firm* — Womble Bond Dickinson (US) LLP

(57) ABSTRACT

A system and method for managing downlink data transmissions with HARQ feedback disabled. In some embodiments, the method includes: receiving, by a User Equipment (UE), a downlink data transmission with Hybrid Automatic Repeat reQuest (HARQ) feedback disabled; and multiplexing, by the UE, a plurality of HARQ-acknowledgment (HARQ-ACK) information bits to form a HARQ-ACK codebook, wherein the multiplexing of the HARQ-ACK information bits does not include multiplexing a HARQ-ACK information bit for the downlink data transmission in the HARQ-ACK codebook.

18 Claims, 9 Drawing Sheets

| DCI format indicator | | |
|---|---|---|
| Carrier indicator | | |
| Bandwidth part indicator | | |
| Frequency domain resource assignment | | |
| Time domain resource assignment | | |
| VRB to PRB mapping | | |
| Rate matching indicator | | |
| Zero power CSI reference signal trigger | | |
| Transport block 1 | Modulation and coding scheme (MCS) | |
| | New data indicator (NDI) | |
| | Redundancy version (RV) | |
| Transport block 2 | Modulation and coding scheme (MCS) | |
| | New data indicator (NDI) | |
| | Redundancy version (RV) | |
| HARQ process number | | |
| TPC command for scheduled PUCCH | | |
| Antenna ports | | |
| Transmission Configuraion indication (TCI) | | |
| SRS Request | | |
| DMRS sequence initialization | | |
| Padding | | |

(58) Field of Classification Search
CPC ............ H04L 1/1896; H04W 72/0473; H04W 72/23; H04W 84/06
See application file for complete search history.

(56) References Cited

U.S. PATENT DOCUMENTS

| | | | | |
|---|---|---|---|---|
| 10,595,358 | B2* | 3/2020 | Babaei | H04L 5/0053 |
| 11,050,542 | B2* | 6/2021 | Park | H04B 7/0413 |
| 11,452,164 | B2* | 9/2022 | Babaei | H04W 8/26 |
| 11,490,406 | B2* | 11/2022 | Choi | H04L 1/1896 |
| 11,627,593 | B2* | 4/2023 | Si | H04W 72/20 370/329 |
| 11,653,353 | B2* | 5/2023 | Choi | H04L 5/0053 370/329 |
| 11,711,806 | B2* | 7/2023 | Awoniyi-Oteri | H04L 1/1822 370/329 |
| 11,722,263 | B2* | 8/2023 | Muruganathan | H04L 1/1822 370/329 |
| 11,737,091 | B2* | 8/2023 | Choi | H04W 72/21 370/329 |
| 11,792,815 | B2* | 10/2023 | Awoniyi-Oteri | H04W 72/23 370/329 |
| 11,844,071 | B2* | 12/2023 | Awoniyi-Oteri | H04W 72/1273 |
| 12,101,194 | B2* | 9/2024 | Muruganathan | H04L 1/1812 |
| 12,132,683 | B2* | 10/2024 | Yang | H04L 1/1896 |
| 2017/0134140 | A1* | 5/2017 | Park | H04L 1/1812 |
| 2018/0242286 | A1* | 8/2018 | Song | H04L 1/0072 |
| 2018/0324889 | A1* | 11/2018 | Babaei | H04L 5/0053 |
| 2019/0356456 | A1* | 11/2019 | Park | H04L 1/1607 |
| 2020/0106586 | A1* | 4/2020 | Nemeth | H04L 1/1854 |
| 2020/0127796 | A1* | 4/2020 | Li | H04L 1/1812 |
| 2020/0214076 | A1* | 7/2020 | Babaei | H04W 76/27 |
| 2020/0313809 | A1 | 10/2020 | Park et al. | |
| 2020/0374089 | A1* | 11/2020 | Yang | H04L 5/0053 |
| 2021/0028891 | A1 | 1/2021 | Zhou et al. | |
| 2021/0105102 | A1 | 4/2021 | Li et al. | |
| 2021/0184801 | A1* | 6/2021 | El Hamss | H04L 1/1896 |
| 2021/0259006 | A1* | 8/2021 | Yoshioka | H04L 1/1861 |
| 2021/0281379 | A1* | 9/2021 | Park | H04W 72/23 |
| 2021/0314094 | A1 | 10/2021 | Gao | |
| 2021/0377985 | A1* | 12/2021 | Awoniyi-Oteri | H04L 1/1822 |
| 2021/0377986 | A1* | 12/2021 | Awoniyi-Oteri | H04L 1/1812 |
| 2022/0201757 | A1* | 6/2022 | Cruz | H04L 5/0053 |
| 2022/0239417 | A1* | 7/2022 | Cheng | H04L 1/1835 |
| 2022/0264614 | A1* | 8/2022 | Yu | H04L 1/1825 |
| 2022/0286235 | A1* | 9/2022 | Ranta-Aho | H04L 1/1822 |
| 2022/0286242 | A1* | 9/2022 | Khan | H04W 72/23 |
| 2022/0303065 | A1* | 9/2022 | Hosseinian | H04L 1/1812 |
| 2022/0361211 | A1* | 11/2022 | Karaki | H04L 1/1685 |
| 2022/0376844 | A1* | 11/2022 | Muruganathan | H04L 1/1896 |
| 2022/0377776 | A1* | 11/2022 | Choi | H04L 1/1614 |
| 2022/0377777 | A1* | 11/2022 | Choi | H04L 1/1812 |
| 2022/0417975 | A1* | 12/2022 | Awoniyi-Oteri | H04L 1/1819 |
| 2023/0049911 | A1* | 2/2023 | Hu | H04L 12/1868 |
| 2023/0145930 | A1* | 5/2023 | Park | H04L 1/1861 370/329 |
| 2023/0163887 | A1* | 5/2023 | Cheng | H04W 72/23 370/329 |
| 2023/0231665 | A1* | 7/2023 | Wu | H04L 1/1854 370/329 |
| 2023/0291504 | A1* | 9/2023 | Cheng | H04W 76/20 |
| 2023/0308226 | A1* | 9/2023 | Muruganathan | H04L 1/1812 |
| 2023/0361924 | A1* | 11/2023 | Lei | H04L 1/1664 |
| 2023/0397202 | A1* | 12/2023 | Choi | H04L 1/1812 |
| 2024/0015723 | A1* | 1/2024 | Yang | H04L 5/001 |
| 2024/0023135 | A1* | 1/2024 | Ye | H04L 1/1822 |
| 2024/0032013 | A1* | 1/2024 | Kumagai | H04W 72/11 |
| 2024/0072939 | A1* | 2/2024 | Niu | H04L 1/1812 |
| 2024/0187141 | A1* | 6/2024 | Ying | H04L 1/1854 |

FOREIGN PATENT DOCUMENTS

| | | | | |
|---|---|---|---|---|
| CN | 112511275 | A1 | 3/2021 | |
| CN | 113796033 | A * | 12/2021 | ............ H04L 1/1621 |
| CN | 111567098 | B * | 4/2022 | ............ H04L 1/1812 |
| CN | 115119313 | A * | 9/2022 | ............ H04L 1/1812 |
| CN | 116743321 | A * | 9/2023 | ............ H04L 1/1614 |
| CN | 116743322 | A * | 9/2023 | ............ H04L 1/1614 |
| CN | 116743323 | A * | 9/2023 | ............ H04L 1/1614 |
| EP | 3955501 | A1 * | 2/2022 | ............ H04L 1/1614 |
| EP | 4060919 | A1 * | 9/2022 | ............ H04L 1/1812 |
| KR | 20210141700 | A * | 11/2021 | |
| KR | 20220131167 | A * | 9/2022 | |
| KR | 102511925 | B1 * | 3/2023 | |
| KR | 20230038694 | A * | 3/2023 | |
| WO | WO-2017030489 | A1 * | 2/2017 | ............ H04L 1/0072 |
| WO | WO-2020040179 | A1 * | 2/2020 | ............ H04L 1/1819 |
| WO | WO-2020205728 | A1 * | 10/2020 | ............ H04L 1/1614 |
| WO | WO-2021063828 | A1 * | 4/2021 | ............ H04L 1/1607 |
| WO | WO-2018204845 | A1 * | 3/2022 | ............ H04L 5/0007 |
| WO | WO-2022051738 | A1 * | 3/2022 | |
| WO | WO-2022053843 | A1 * | 3/2022 | |

OTHER PUBLICATIONS

ZTE, Summary#3 of AI 8.4.3 for HARQ for NTN, Oct. 26, 2020, 3GPP TSG RAN WG1 Meeting #103-e, E-meeting, Agenda Item : 8.4.3, Tdoc: R1-2009695 (Year: 2020).*

OPPO, Discussion on HARQ enhancement, Jan. 25, 2021, 3GPP TSG RAN WG1 #104-e, E-meeting, Agenda Item: 8.4.3, Tdoc: R1-2100158 (Year: 2021).*

Huawei et al., Discussion on HARQ enhancement for NTN, Jan. 25, 2021, 3GPP TSG RAN WG1 #104-e, E-meeting, Agenda Item: 8.4.3, Tdoc: R1-2100224 (Year: 2021).*

ZTE, Discussion on HARQ for NTN, Jan. 25, 2021, 3GPP TSG RAN WG1 #104-e, E-meeting, Agenda Item: 8.4.3, Tdoc: R1-2100246 (Year: 2021).*

CAICT, Enhancements on HARQ to support NTN, Jan. 25, 2021, 3GPP TSG RAN WG1 #104-e, E-meeting, Agenda Item: 8.4.3, Tdoc: R1-2100306 (Year: 2021).*

CATT, HARQ operation enhancement for NTN, Jan. 25, 2021, 3GPP TSG RAN WG1 #104-e, E-meeting, Agenda Item: 8.4.3, Tdoc: R1-2100383 (Year: 2021).*

Vivo, Discussion on HARQ enhancements for NR-NTN, Jan. 25, 2021, 3GPP TSG RAN WG1 #104-e, E-meeting, Agenda Item: 8.4.3, Tdoc: R1-2100443 (Year: 2021).*

Bupt, Discussion on HARQ enhancement for NTN, Jan. 25, 2021, 3GPP TSG RAN WG1 #104-e, E-meeting, Agenda Item: 8.4.3, Tdoc: R1-2100491 (Year: 2021).*

MediaTek Inc., HARQ in NR-NTN, Jan. 25, 2021, 3GPP TSG RAN WG1 #104-e, E-meeting, Agenda Item: 8.4.3, Tdoc: R1-2100596 (Year: 2021).*

Intel Corporation, On HARQ enhancements for NTN, Jan. 25, 2021, 3GPP TSG RAN WG1 #104-e, E-meeting, Agenda Item: 8.4.3, Tdoc: R1-2100656 (Year: 2021).*

LG Electronics, Discussions on HARQ enhancements in NTN, Jan. 25, 2021, 3GPP TSG RAN WG1 #104-e, E-meeting, Agenda Item: 8.4.3, Tdoc: R1-2100705 (Year: 2021).*

Lenovo et al., Enhancements on HARQ for NTN, Jan. 25, 2021, 3GPP TSG RAN WG1 #104-e, E-meeting, Agenda Item: 8.4.3 , Tdoc: R1-2100759 (Year: 2021).*

Spreadtrum Communications, Consideration on Enhancements on HARQ, Jan. 25, 2021, 3GPP TSG RAN WG1 #104-e, E-meeting, Agenda Item: 8.4.3, Tdoc: R1-2100809 (Year: 2021).*

Sony, Enhancements on HARQ for NTN, Jan. 25, 2021, 3GPP TSG RAN WG1 #104-e, E-meeting, Agenda Item: 8.4.3, Tdoc: R1-2100861 (Year: 2021).*

China Telecom, Discussion on HARQ Enhancements in NR-NTN, Jan. 25, 2021, 3GPP TSG RAN WG1 #104-e, E-meeting, Agenda Item: 8.4.3, Tdoc: R1-2100913 (Year: 2021).*

Ericsson, On HARQ enhancements for NTN, Jan. 25, 2021, 3GPP TSG RAN WG1 #104-e, E-meeting, Agenda Item: 8.4.3, Tdoc: R1-2100928 (Year: 2021).*

(56) References Cited

OTHER PUBLICATIONS

Asia Pacific Telecom et al., Enhancements on HARQ in NTN, Jan. 25, 2021, 3GPP TSG RAN WG1 #104-e, E-meeting, Agenda Item: 8.4.3, Tdoc: R1-2100973 (Year: 2021).*

Interdigital, Inc., On HARQ enhancement for NTN, Jan. 25, 2021, 3GPP TSG RAN WG1 #104-e, E-meeting, Agenda Item: 8.4.3, Tdoc: R1-2100986 (Year: 2021).*

Panasonic, HARQ enhancement for NTN, Jan. 25, 2021, 3GPP TSG RAN WG1 #104-e, E-meeting, Agenda Item: 8.4.3, Tdoc: R1-2101025 (Year: 2021).*

CMCC, Enhancements on HARQ for NTN, Jan. 25, 2021, 3GPP TSG RAN WG1 #104-e, E-meeting, Agenda Item: 8.4.3, Tdoc : R1-2101044 (Year: 2021).*

ETRI, Discussion on HARQ Enhancements for NTN, Jan. 25, 2021, 3GPP TSG RAN WG1 #104-e, E-meeting, Agenda Item: 8.4.3, Tdoc: R1-2101080 (Year: 2021).*

Xiaomi, Discussion on the HARQ enhancement for NTN, Jan. 25, 2021, 3GPP TSG RAN WG1 #104-e, E-meeting, Agenda Item: 8.4.3, Tdoc: R1-2101119 (Year: 2021).*

Samsung, Enhancements on HARQ for NTN, Jan. 25, 2021, 3GPP TSG RAN WG1 #104-e, E-meeting, Agenda Item: 8.4.3, Tdoc: R1-2101208 (Year: 2021).*

Thales, Discussion on HARQ for NTN, Jan. 25, 2021, 3GPP TSG RAN WG1 #104-e, E-meeting, Agenda Item: 8.4.3, Tdoc: R1-2101289 (Year: 2021).*

Nokia et al., On HARQ operation for NTN systems, Jan. 25, 2021, 3GPP TSG RAN WG1 #104-e, E-meeting, Agenda Item: 8.4.3, Tdoc: R1-2101298 (Year: 2021).*

Apple, Discussion on HARQ Enhancements for NTN, Jan. 25, 2021, 3GPP TSG RAN WG1 #104-e, E-meeting, Agenda Item: 8.4.3, Tdoc: R1-2101385 (Year: 2021).*

Qualcomm Incorporated, Enhancements on HARQ for NTN, Jan. 25, 2021, 3GPP TSG RAN WG1 #104-e, E-meeting, Agenda Item: 8.4.3, Tdoc: R1-2101466 (Year: 2021).*

ZTE, Summary of AI 8.4.3 for HARQ for NTN, Jan. 25, 2021, 3GPP TSG RAN WG1 #104-e, E-meeting, Agenda Item: 8.4.3, Tdoc: R1-2101781 (Year: 2021).*

ZTE, Summary of AI 8.4.3 for HARQ for NTN, Jan. 25, 2021, 3GPP TSG RAN WG1 #104-e, E-meeting, Agenda Item: 8.4.3, Tdoc: R1-2101903 (Year: 2021).*

Samsung: "Enhancements on HARO for NTN," 3GPP, R1-2101208, 3rd Generation Partnership Project (3GPP), Jan. 2021, 6 pages, Retrieved from the Internet: URL:https://ftp.3gpp.org/tsg_ran/WG1_RL1/TSGR1_104-e/Docs/ R1-2101208.zip.

Moderator (ZTE): "Summary#3 of AI 8.4.3 for HARQ for NTN," 3GPP, R1-2009695, 3rd Generation Partnership Project (3GPP), Nov. 2020, XP051953521, 45 pages, Retrieved from the Internet: URL:https://ftp.3gpp.org/tsg_ran/WG1_RL 1/TSGR1_103-e/Docs/ R1-2009695.zip.

Sony: "Enhancements on HARQ for NTN," 3GPP, R1-2100861, 3rd Generation Partnership Project (3GPP), Jan. 2021, XP051971213, 6 pages, Retrieved from the Internet: URL:https://ftp.3gpp.org/tsg_ran/WG1_RL1/TSGR1_104-e/Docs/ R1-2100861.zip.

Ericsson: "On HARQ enhancements for NTN," 3GPP, R1-2009093, 3rd Generation Partnership Project (3GPP), Oct. 2020, XP051946822, 10 pages, Retrieved from the Internet: URL:https://ftp.3gpp.org/tsg_ran/WG1 _RL1/TSGR1_103-e/Docs/ R1-2009093.zip.

EPO Extended European Search Report dated Aug. 4, 2022, issued in corresponding European Patent Application No. 22160424.2 (14 pages).

"Multiplexing and channel coding", 3rd Generation Partnership Project Technical Specification 38.212, V16.4.0, Release 16, Dec. 2020, 152 pages, 3GPP Organizational Partners.

"Physical layer procedures for control", 3rd Generation Partnership Project Technical Specification 38.213, V16.2.0, Release 16, Jul. 2020, 180 pages, ETSI.

"Physical layer procedures for data", 3rd Generation Partnership Project Technical Specification 38.214, V16.5.0, Release 16, Apr. 2021, 173 pages, ETSI.

Taiwanese Office Action for TW Application No. 11420382660 dated Apr. 14, 2025, 13 pages.

* cited by examiner

| |
|---|
| DCI format indicator |
| Carrier indicator |
| Bandwidth part indicator |
| Frequency domain resource assignment |
| Time domain resource assignment |
| VRB to PRB mapping |
| Rate matching indicator |
| Zero power CSI reference signal trigger |
| Transport block 1 — Modulation and coding scheme (MCS) / New data indicator (NDI) / Redundancy version (RV) |
| Transport block 2 — Modulation and coding scheme (MCS) / New data indicator (NDI) / Redundancy version (RV) |
| HARQ process number |
| TPC command for scheduled PUCCH |
| Antenna ports |
| Transmission Configuration indication (TCI) |
| SRS Request |
| DMRS sequence initialization |
| Padding |

FIG. 1

| Fields | DCI format 0_1 | DCI format 1_1 |
|---|---|---|
| DCI format indicator | 1 | 1 |
| Frequency domain resource assignment | 14 | 14 |
| Time domain resource assignment | 4 | 4 |
| VRB-to-PRB mapping or FH flag | 1 | 1 |
| Modulation and coding scheme (MCS) | 5 | 5 |
| New data indicator (NDI) | 1 | 1 |
| Redundancy version (RV) | 2 | 2 |
| HARQ process number | 5 | 5 |
| DAI | 1 or 2 | 0 |
| TPC command for PUCCH/PUSCH | 2 | 2 |
| PUCCH resource indicator | - | 0 |
| PDSCH-to-HARQ feedback timing indicator | - | 0 |
| CRC | 24 | 24 |

FIG. 2

WIRELESS TRANSMISSIONS WITH HYBRID AUTOMATIC REPEAT REQUEST (HARQ) FEEDBACK DISABLED

CROSS-REFERENCE TO RELATED APPLICATION(S)

The present application claims priority to and the benefit of U.S. Provisional Application No. 63/163,578, filed Mar. 19, 2021, entitled "METHODS FOR HARQ-ACK CODEBOOK SIZE DETERMINATION FOR NON-TERRESTRIAL NETWORKS", the entire content of which is incorporated herein by reference.

FIELD

One or more aspects of embodiments according to the present disclosure relate to wireless communications, and more particularly to wireless communications in which Hybrid Automatic Repeat reQuest (HARQ) feedback may be disabled.

BACKGROUND

Especially in non-terrestrial networks (NTNs), which may have significant propagation delays, it may be advantageous to disable Hybrid Automatic Repeat reQuest (HARQ) feedback. Such disabling may affect the behavior of a User Equipment (UE), for example in that the UE may expect to receive further transmissions or retransmissions with the same HARQ process identifier sooner than if HARQ feedback were enabled. Moreover, certain data bits, that are sent in association with HARQ processes for which HARQ feedback is enabled, may be superfluous in in association with HARQ processes for which HARQ feedback disabled.

It is with respect to this general technical environment that aspects of the present disclosure are related.

SUMMARY

According to an embodiment of the present disclosure, there is provided a method, including: receiving, by a User Equipment (UE), a downlink data transmission with Hybrid Automatic Repeat reQuest (HARQ) feedback disabled; and multiplexing, by the UE, a plurality of HARQ-acknowledgment (HARQ-ACK) information bits to form a HARQ-ACK codebook, wherein the multiplexing of the HARQ-ACK information bits does not include multiplexing a HARQ-ACK information bit for the downlink data transmission in the HARQ-ACK codebook.

In some embodiments: the downlink data transmission is scheduled by semi-persistent scheduling (SPS), and the multiplexing of the HARQ-ACK information bits does not include multiplexing a HARQ-ACK information bit for the downlink data transmission in the HARQ-ACK codebook.

In some embodiments: the HARQ-ACK codebook includes a Type-3 HARQ-ACK codebook; the downlink data transmission is scheduled by Dynamic Grant (DG); and the Type-3 HARQ-ACK codebook does not include a HARQ-ACK information bit corresponding to the downlink data transmission.

In some embodiments: the HARQ-ACK codebook includes a Type-2 HARQ-ACK codebook; the downlink data transmission is scheduled by Dynamic Grant (DG); and the Type-2 HARQ-ACK codebook does not include a HARQ-ACK information bit corresponding to the downlink data transmission.

In some embodiments, the method further includes receiving a Downlink Control Information (DCI) scheduling the downlink data transmission, wherein: the DCI does not include a counter Downlink Assignment Indicator (c-DAI); and the DCI does not include a total Downlink Assignment Indicator (t-DAI).

In some embodiments, the method further includes receiving a Downlink Control Information (DCI) scheduling the downlink data transmission, wherein: the DCI includes a counter Downlink Assignment Indicator (c-DAI); and the DCI includes a total Downlink Assignment Indicator (t-DAI).

In some embodiments, the method further includes: disregarding the c-DAI; and determining the length of the Type-2 HARQ-ACK codebook based on the t-DAI.

In some embodiments, the method further includes determining the length of the Type-2 HARQ-ACK codebook based on the c-DAI and based on the t-DAI.

In some embodiments, the method further includes: disregarding the c-DAI; and disregarding the t-DAI.

In some embodiments, the method further includes receiving a Downlink Control Information (DCI) scheduling the downlink data transmission, wherein: the DCI lacks at least one of: a Physical Uplink Control Channel (PUCCH) resource indicator field, a Physical Downlink Shared Channel (PDSCH) to HARQ feedback timing indicator field, a Code Block Group Transmission Information (CBGTI) field, a Code Block Group Flushing out Information (CBGFI) field, a PUCCH Resource Indicator (PRI) field, a Physical Uplink Shared Channel (PUSCH)-to-HARQ_feedback timing field, a counter Downlink Assignment Indicator (c-DAI) field, and a Transmit Power Control (TPC) command field.

In some embodiments, the method further includes receiving a retransmission of the downlink data transmission.

According to an embodiment of the present disclosure, there is provided a User Equipment (UE), including: a radio; and a processing circuit, the processing circuit being configured to: receive a downlink data transmission with Hybrid Automatic Repeat reQuest (HARQ) feedback disabled; and multiplex a plurality of HARQ-acknowledgment (HARQ-ACK) information bits to form a HARQ-ACK codebook, wherein the multiplexing of the plurality of HARQ-ACK information bits does not include multiplexing a HARQ-ACK information bit for the downlink data transmission in the HARQ-ACK codebook.

In some embodiments: the downlink data transmission is scheduled by semi-persistent scheduling (SPS), and the multiplexing of the plurality of HARQ-ACK information bits does not include multiplexing a HARQ-ACK information bit for the downlink data transmission in the HARQ-ACK codebook.

In some embodiments: the HARQ-ACK codebook includes a Type-3 HARQ-ACK codebook; the downlink data transmission is scheduled by Dynamic Grant (DG); and the Type-3 HARQ-ACK codebook does not include a HARQ-ACK information bit corresponding to the downlink data transmission.

In some embodiments: the HARQ-ACK codebook includes a Type-2 HARQ-ACK codebook; the downlink data transmission is scheduled by Dynamic Grant (DG); and the Type-2 HARQ-ACK codebook does not include a HARQ-ACK information bit corresponding to the downlink data transmission.

In some embodiments, the processing circuit is further configured to receive a Downlink Control Information (DCI)

scheduling the downlink data transmission, wherein: the DCI does not include a counter Downlink Assignment Indicator (c-DAI); and the DCI does not include a total Downlink Assignment Indicator (t-DAI).

In some embodiments, the processing circuit is further configured to receive a Downlink Control Information (DCI) scheduling the downlink data transmission, wherein: the DCI includes a counter Downlink Assignment Indicator (c-DAI); and the DCI includes a total Downlink Assignment Indicator (t-DAI).

In some embodiments, the processing circuit is further configured to: disregard the c-DAI; and determine the length of the Type-2 HARQ-ACK codebook based on the t-DAI.

In some embodiments, the processing circuit is further configured to determine the length of the Type-2 HARQ-ACK codebook based on the c-DAI and based on the t-DAI.

According to an embodiment of the present disclosure, there is provided a User Equipment (UE), including: a radio; and means for processing, the means for processing being configured to: receive a downlink data transmission with Hybrid Automatic Repeat reQuest (HARQ) feedback disabled; and multiplex a plurality of HARQ-acknowledgment (HARQ-ACK) information bits to form a HARQ-ACK codebook, wherein the multiplexing of the plurality of HARQ-ACK information bits does not include multiplexing a HARQ-ACK information bit for the downlink data transmission in the HARQ-ACK codebook.

BRIEF DESCRIPTION OF THE DRAWINGS

These and other features and advantages of the present disclosure will be appreciated and understood with reference to the specification, claims, and appended drawings wherein:

FIG. 1 is a format table, according to an embodiment of the present disclosure;

FIG. 2 is a format table, according to an embodiment of the present disclosure;

DETAILED DESCRIPTION

Figure 3:
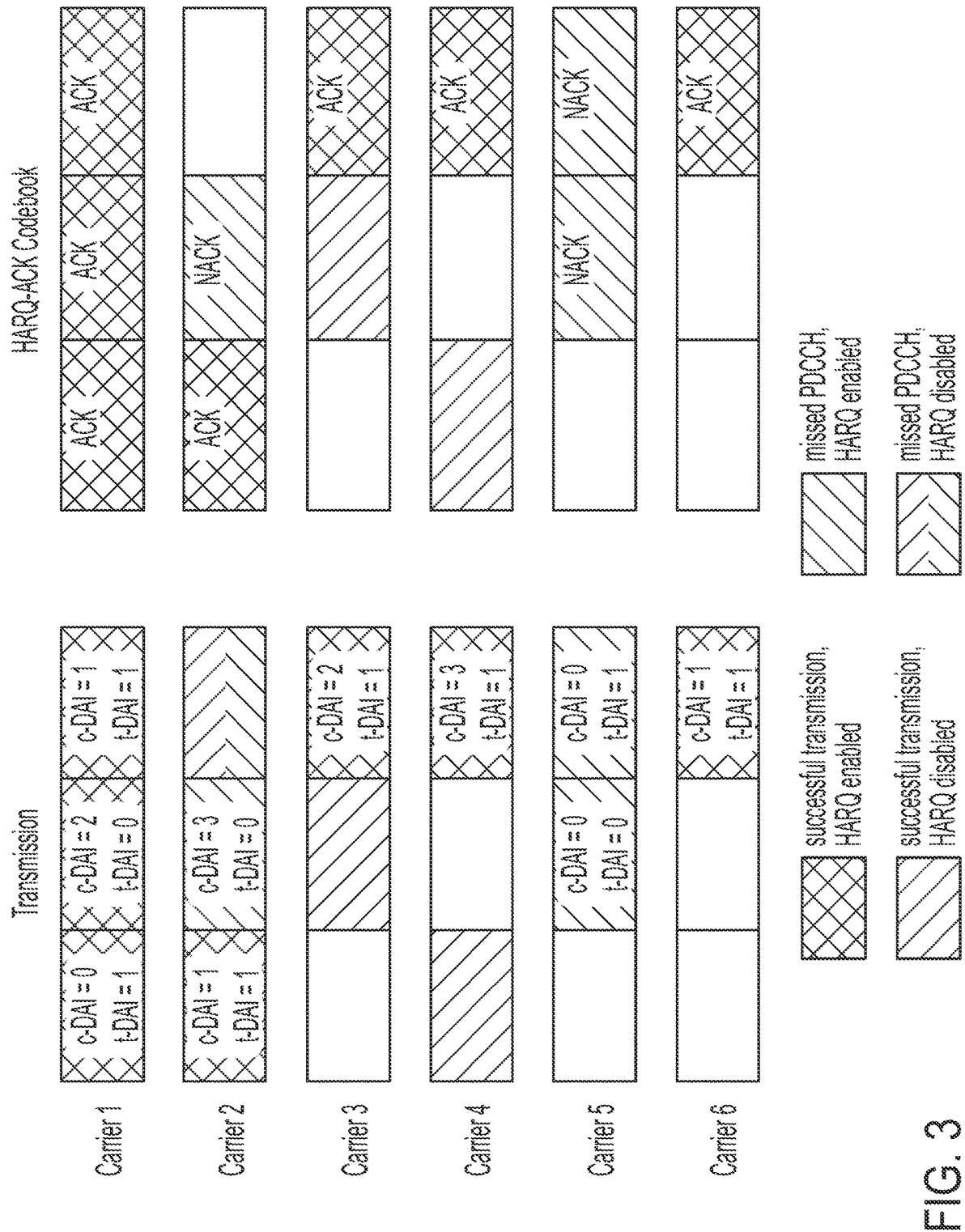
FIG. 3 is an illustration of downlink data transmissions and corresponding acknowledgment data, according to an embodiment of the present disclosure.

The detailed description set forth below in connection with the appended drawings is intended as a description of exemplary embodiments of a system and method for managing downlink data transmissions with HARQ feedback disabled provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A Hybrid Automatic Repeat reQuest (HARQ) scheme has been adopted in some mobile communication systems since the 3rd generation (3G) of the Third Generation Partnership Project (3GPP) New Radio (NR) standard as a transmission and retransmission protocol in which the receiver checks for errors in the received data. If the data is received and decoded successfully the receiver reports acknowledgment to the transmitter by sending an acknowledgement (ACK) feedback signal. Otherwise, if an error is detected then the receiver requests a retransmission by sending a negative acknowledgement (NACK) feedback signal. The 5th generation of the New Radio standard (5G NR) supports very high bit rates and multiple simultaneous carriers. A User Equipment (UE) can be configured to use carrier aggregation, spatial multiplexing and dual connectivity at the same time. This means that a UE should be able to report the success or failure of the transmission of multiple transport blocks at the same time. In other words, a UE is required to signal a set of HARQ acknowledgments to the Base Station (gNB). The "HARQ-ACK codebook" defines the format used to signal a set of HARQ acknowledgments to the gNB. The codebook allows the UE to multiplex the HARQ acknowledgments from multiple slots, multiple carriers, multiple HARQ processes, multiple Transport Blocks (TB), and multiple Code Block Groups (CBG), within a single transmission. The UE and the gNB may share the same understanding of the codebook format to ensure that each acknowledgment is linked to the appropriate downlink data transmission. The 3GPP has specified three categories of HARQ-ACK codebook, Type 1, Type 2, and Type 3. As used herein, a "downlink data transmission" is any transmission of data by the gNB to the UE. Examples of downlink data transmissions include transmissions associated with Type 1, Type 2, and Type 3 HARQ-ACK codebooks, and transmissions scheduled by Semi-Persistent Scheduling (SPS) (discussed in further detail below).

The size of a Type 1 codebook is fixed in a semi-static manner, and is set by the information provided by Radio Resource Control RRC signaling. The size of the Type-1 codebook size is defined as the sum of all possible transmission opportunities within a specific time window. This sum accounts for the possibility of multiple Physical Downlink Shared Channels (PDSCHs) transmitted within a single slot, multiple PDSCHs transmitted across slots, multiple PDSCHs transmitted across carriers, multiple TBs that belong to a specific PDSCH, and multiple CBGs that belong to a specific Transport Block (TB).

The size of a Type-2 codebook changes dynamically according to the number of resource allocations. This codebook helps to improve efficiency by excluding codebook entries that correspond to unused transmission opportunities. With the Type-2 codebook, only the acknowledgement information for the scheduled transmission opportunities is included in the HARQ ACK codebook feedback, as opposed to the acknowledgement information for all possible transmission opportunities as is the case for the Type-1 codebook. Hence, the size of the codebook may vary dynamically as a function of the number of scheduled opportunities. This may reduce the size of the HARQ acknowledgment message. The implementation of the Type-2 HARQ-ACK codebook would be a straightforward option, if there were no errors in the downlink control signaling. However, in the presence of an error in the downlink control signaling, the UE and the gNB may have a different understanding of the number of scheduled opportunities, which would lead to an incorrect codebook size and corrupted HARQ feedback. If a UE misses a resource allocation in the Physical Downlink Control Channel (PDCCH), since the UE does not become aware of the allocated resource at all, it will form a smaller codebook, and the one-to-one mapping between codebook entry and downlink data transmission will be lost. This leads to a misunderstanding between the UE and the gNB, and the gNB would not know which HARQ information corresponds to which downlink data transmission.

To mitigate such cases, the 3GPP NR standard supports the use of a Downlink Assignment Indicator (DAI) which is included in the Downlink Control Information (DCI) scheduling the downlink data transmission. The DAI field is divided into two parts, a counter DAI (c-DAI) and a total DAI (t-DAI). If the UE is configured with only a single serving cell, then only the c-DAI will be required. Both DCI Formats 1_0 and 1_1 include a 2-bit field for the c-DAI. The UE detects a missed transmission if it receives non-consecutive counter values. The UE can then insert a negative acknowledgement and maintain the relationship between the acknowledgements and transmissions. The c-DAI has a range from 0 to 3 so it is able to detect up to three consecutive missed transmissions. The counter value wraps after every fourth transmission; as a result, four consecutive missed transmissions would not be detected.

A combination of the c-DAI and t-DAI is used when the UE is configured with multiple serving cells (carrier aggregation). The c-DAI included in the DCI indicates the number of scheduled downlink transmissions, up to the point that the DCI was received, in a carrier-first-time-second order. The t-DAI included in the DCI indicates the total number of downlink transmissions across all carriers up to this point in time, i.e., the highest c-DAI at the current point in time. The UE can detect one or more missed transmissions by comparing the t-DAI with the actual number of received transmissions at the end of each time interval. The c-DAI can be used to identify the location of any missed transmissions, i.e., to identify the codebook position where a negative acknowledgement should be inserted.

The size of a Type-3 codebook is also fixed, as it is in Type-1. The Type-3 HARQ-ACK codebook was originally introduced for New Radio Unlicensed (NR-U) in the unlicensed band; in later versions of the 3GPP standard it was decided that this codebook could also be supported in licensed bands. The Type-3 codebook is provided in a one-shot manner. The UE determines a Type-3 codebook by having acknowledgement bits for all serving cells, HARQ processes, Transport Blocks, and Code Block Groups in the following order: (i) serving cell index, (ii) HARQ process number, (iii) TB index, and (iv) CBG index. The UE transmits positive acknowledgment (ACK) for all successful transmissions and negative acknowledgment (NACK) for all failed or missed transmissions. The Type-3 HARQ-ACK codebook is similar to the Type-1 HARQ-ACK codebook in terms of the codebook size; its size is semi-static and fixed.

Non-Terrestrial Networks (NTN) support dynamic enabling and disabling of the HARQ feedback when scheduling a PDSCH. That is, for some transmissions when HARQ feedback is disabled by the gNB, the UE is not required to transmit the HARQ feedback to the gNB. Enabling or disabling of HARQ feedback for downlink transmission is configurable per HARQ process via UE-specific RRC (Radio Resource Control) signaling. As such, the HARQ feedback for some of the HARQ processes may be disabled, and the UE is not required to populate the acknowledgment information for those HARQ processes in the HARQ-ACK codebook. This provides opportunities to reduce the HARQ-ACK codebook size by omitting disabled HARQ processes from the feedback. Especially for a Type-2 codebook, for which the codebook size changes dynamically, the codebook size can be reduced further by not transmitting HARQ feedback for disabled HARQ processes (i.e., by not including, in a HARQ-ACK codebook, a HARQ-ACK information bit corresponding to a downlink data transmission with HARQ feedback disabled). Also, for a Type-3 codebook, since the size of the codebook depends on the number of active HARQ processes, the codebook size can be reduced by not including the HARQ feedback information for disabled HARQ processes. As such, some embodiments define new procedures for HARQ-ACK codebook size determination for Type-2 and Type-3 codebooks.

Various approaches for Type-2 codebook size determination may be employed. In a first approach, c-DAI and t-DAI are not included in the DCI. In this approach the DCI scheduling a downlink data transmission with HARQ feedback disabled may lack the c-DAI and t-DAI fields. As such, no c-DAI and t-DAI information is available to the UE for downlink data transmissions with HARQ feedback disabled, and, in order to construct the Type-2 codebook, the UE uses the c-DAI and t-DAI fields that are present only in the DC's for transmissions with HARQ feedback enabled.

To implement this approach, one or more new DCI formats may be defined for scheduling transmissions with HARQ feedback disabled. For such transmissions, since HARQ feedback is disabled, other redundant fields may be removed from the scheduling DCI. In a first example, in DCI format 1_1, the following fields may be unused if HARQ is disabled for a transmission: (i) PUCCH resource indicator (3 bits), which is otherwise used to instruct the UE to use a specific PUCCH Resource when returning HARQ acknowledgments, (ii) PDSCH to HARQ feedback timing indicator (0, 1, 2, or 3 bits), which otherwise determines the number of slots between reception of the PDSCH and transmission of the HARQ acknowledgment, (iii) CBG transmission information, CBGTI (0, 2, 4, 6, or 8 bits), which is applicable when a UE is configured to receive downlink data using Code Block Groups (CBG), and (iv) CBG flushing out information, CBGFI (0 or 1 bit), which is used as a flag to indicate whether or not the set of CBGs being retransmitted can be combined with a previous transmission. As many as 15 bits may be omitted from the DCI in these four categories. Moreover, the length of the DCI may be reduced by up to 4 additional bits by the omission of c-DAI and t-DAI; as such, the length of the DCI may be reduced by a total of up to 19 bits. An example of the contents of the new DCI based on DCI format 1_1 is shown in FIG. 1, in which the above redundant fields as well as c-DAI and t-DAI have been removed.

In this first approach, a reduced size DCI format is used for the transmission with HARQ feedback disabled. In NR the total number of different DCI sizes with Cell Radio Network Temporary Identifier (C-RNTI) that a UE is configured to monitor is up to three. For a non-terrestrial network (NTN) UE, if the number of DCI sizes with C-RNTI that the UE is configured to monitor is less than the maximum, e.g., less than three, the UE can be configured to monitor two different DCI sizes for PDCCH: one for transmission with HARQ feedback disabled, and one for transmission with HARQ feedback enabled. If, however, the number of configured DCI sizes with C-RNTI for the UE to monitor is already at the maximum, e.g., 3, the DCI with HARQ feedback disabled may be padded to the next larger DCI size that the UE has been configured to monitor. If this is done, there is no increase in the number of blind decodings, over the number specified by the existing NR requirements. This padding requirement may be specified, for example, with the following language: "If the UE is configured to monitor DCI format X for a grant for a HARQ process that does not require feedback and if the DCI size does not match a DCI size the UE is configured to monitor, zeros shall be appended to DCI format X until the payload size equals that of the next DCI size the UE is configured to monitor."

On the receiving end, the UE receives PDCCH in monitoring occasions with no c-DAI and t-DAI fields in DC's for transmissions with HARQ feedback disabled and determines the HARQ-ACK codebook size based only on the c-DAI and t-DAI fields in scheduling DCIs for the transmissions with HARQ feedback enabled.

In a second approach, redundant fields are the ones associated with PUCCH transmission or with Type-2 HARQ-ACK codebook determination and include the PUCCH Resource Indicator (PRI), PUSCH-to-HARQ_feedback timing, and counter DAI (for Type-2 HARQ-ACK codebook (CB)) fields for a total of 6-8 bits. The Transmit Power Control (TPC) command field is also unnecessary but it can be kept (as shown in FIG. 2 (discussed in further detail below)) to avoid unnecessary padding bits in DCI format 1_1.

Considering that an NTN is unlikely to support 2 TBs in a PDSCH, DCI format 1_1 with size reduced by 6-8 bits has smaller size than DCI format 0_1 by 1-2 bits, leading to an overhead reduction of 5-6 bits or ~8%-9%, resulting in ~0.4/0.3/0.3 dB in block error rate (BLER)/coverage gain for an Aggregate Level (AL) of 2/4/8 Control Channel Elements (CCEs) when DCI format 1_1 is size matched to DCI format 0_1. FIG. 2 summarizes the mandatory fields in DCI format 0_1 and DCI format 1_1 for a HARQ process with disabled HARQ-ACK report when redundant fields are removed (a bandwidth (BW) of 20 MHz and 15 kHz SCS for operation at 2 GHz are assumed although these assumptions do not affect conclusions). There is no DCI format ambiguity as an identifier flag (the DCI format indicator) exists. Also, there is no increase in the number of PDCCH blind decoding operations as DCI formats 0_1/1_1 are always in a same search space set (and, in any event, DCI format 1_1 for a HARQ process with disabled HARQ-ACK is size-matched to DCI format 1_0). It may be seen that 5-6 bits can be saved from DCI format 1_1 by not including bits that are superfluous when HARQ-ACK is disabled.

FIG. 3 shows an example with six carriers (serving cells). The UE is configured to report HARQ-ACK feedback for PDSCH reception in three slots across six carriers as shown. Thirteen PDSCH transmissions are scheduled, three of which have their HARQ processes disabled. Three scheduling PDCCHs for transmission with HARQ feedback enabled are missed. Moreover, one scheduling PDCCH for transmission with HARQ feedback disabled is missed. The UE inspects the c-DAI and t-DAI fields in the scheduling DCIs for the transmissions (e.g., the downlink data transmissions) with HARQ feedback enabled, and successfully determines the HARQ-ACK codebook size. As shown in FIG. 3, the UE would feed back the codebook '1110011101' (assuming '1' indicates ACK, and '0' NACK).

If the DCI scheduling a downlink data transmission includes a c-DAI and a t-DAI (e.g., if the c-DAI and t-DAI fields are sent to the UE), i.e., if the c-DAI and the t-DAI are not omitted from the DCI for HARQ processes with HARQ-ACK disabled, then several options are available for handling c-DAI and t-DAI. For example, (i) the UE may ignore c-DAI and count t-DAI (i.e., use t-DAI to infer whether scheduling PDCCHs have been missed), (ii) the UE may count c-DAI and count t-DAI, or (iii) the UE may ignore c-DAI and ignore t-DAI. In each case, the behavior of the gNB may correspond to that of the UE; for example, if the UE ignores a field, the gNB may not fill the field with meaningful information. As used herein, if the UE "counts" c-DAI or t-DAI, it means that the UE may expect the c-DAI or t-DAI to contain meaningful information.

As mentioned above, in a first option, the UE may ignore c-DAI, and count t-DAI, and the gNB may not fill the c-DAI field in the scheduling DCI with meaningful information for the transmissions with HARQ feedback disabled. The gNB, however, increments the c-DAI for the transmissions with HARQ feedback enabled and accordingly calculates the t-DAI for all transmissions (with HARQ feedback enabled or disabled). The UE receives PDCCH in monitoring occasions and ignores the c-DAI field in the DCIs for the transmissions with HARQ feedback disabled. The UE determines the HARQ-ACK codebook size based on (i) the c-DAI for the transmissions with HARQ feedback enabled and (ii) the t-DAI for all transmissions.

Figure 4:
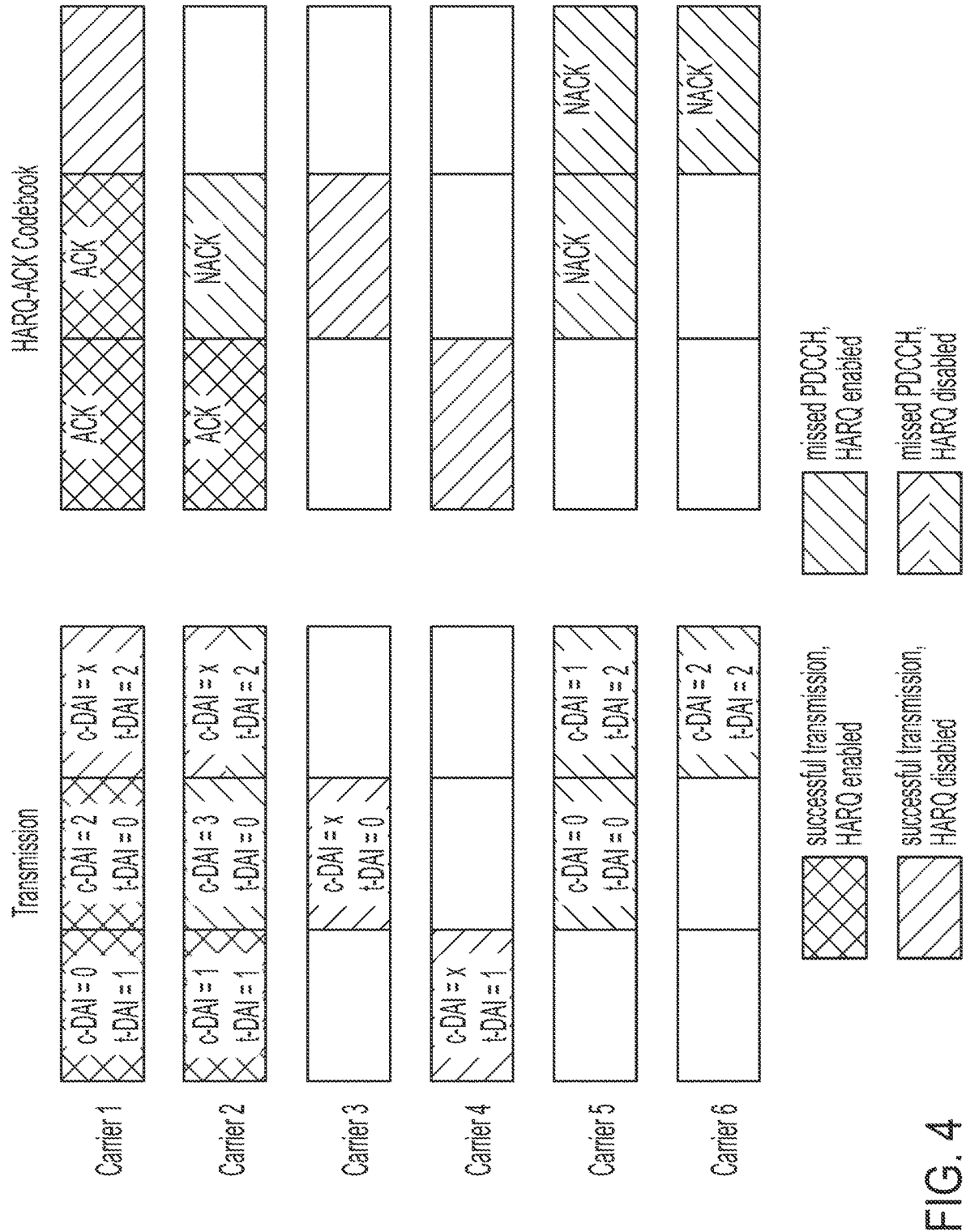
FIG. 4 is an illustration of downlink data transmissions and corresponding acknowledgment data, according to an embodiment of the present disclosure.

FIG. 4 shows an example with six carriers (serving cells). The UE is configured to report HARQ-ACK feedback for PDSCH reception in three slots across six carriers as shown. Eleven PDSCH transmissions are scheduled, four of which have their HARQ processes disabled. Four scheduling PDCCHs for transmissions with HARQ feedback enabled are missed. Moreover, one scheduling PDCCH for a transmission with HARQ feedback disabled is missed. The UE inspects the c-DAI and t-DAI fields in the DCIs for the scheduling PDCCHs, and successfully determines the HARQ-ACK codebook size. The fact that in the last slot (monitoring occasion) a transmission with HARQ feedback disabled is not missed makes it possible for the UE to inspect the t-DAI value to calculate the number of missing PDCCH transmissions in the last monitoring occasion.

As mentioned above, in a second option, the UE may count c-DAI and count t-DAI. The gNB may include both c-DAI and t-DAI in the scheduling DCI for a downlink data transmission with HARQ feedback disabled. The gNB may skip counting c-DAI (e.g., it may not increment c-DAI and instead copy the c-DAI value of the preceding downlink data transmission) for any downlink data transmissions with HARQ feedback disabled, and t-DAI may be equal to the highest c-DAI at the current point in time (i.e., t-DAI may also be calculated without considering the downlink data transmissions with HARQ feedback disabled). For the transmissions with HARQ feedback disabled, the c-DAI field copies the value of the c-DAI from the most recent transmission with HARQ feedback enabled.

The UE receives PDCCH in monitoring occasions and determines the HARQ-ACK codebook size based on the c-DAI and t-DAI for all transmissions. If c-DAI counts continuously for transmissions with HARQ feedback enabled and skips counting for transmissions with HARQ feedback disabled, the UE may infer that no scheduling PDCCHs have been missed.

Figure 5:
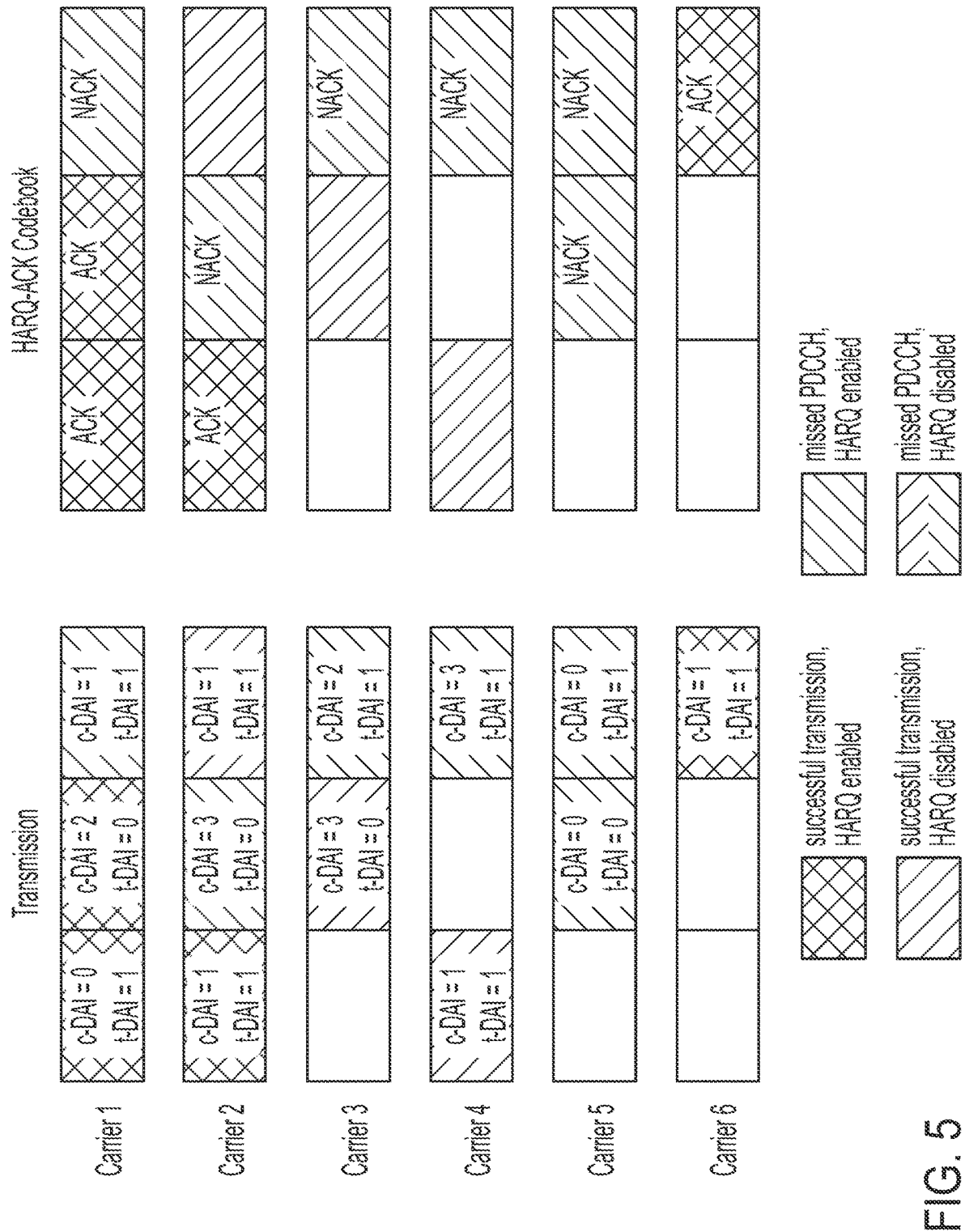
FIG. 5 is an illustration of downlink data transmissions and corresponding acknowledgment data, according to an embodiment of the present disclosure.

FIG. 5 shows an example with six carriers (serving cells). The UE is configured to report HARQ-ACK feedback for PDSCH reception in three slots across six carriers as shown.

Thirteen PDSCH transmissions are scheduled, three of which have their HARQ processes disabled. Six scheduling PDCCHs for transmission with HARQ feedback enabled are missed. Four of the missing PDCCH transmissions occur in the last monitoring occasion. The UE inspects the c-DAI and t-DAI fields in the DCIs for the scheduling PDCCHs, and successfully determines the HARQ-ACK codebook size based on the c-DAI and based on the t-DAI. The fact that in the last monitoring occasion a transmission with HARQ feedback disabled and a transmission with HARQ feedback enabled have the same values for c-DAI makes it possible for the UE to calculate the number of missing PDCCH transmissions.

As mentioned above, in a third option, the UE may ignore (i.e., disregard) both c-DAI and t-DAI. In this option the gNB may not fill the c-DAI and t-DAI fields in the scheduling DCI with meaningful information for the transmissions with HARQ feedback disabled. The gNB, however, increments the c-DAI and accordingly calculates the t-DAI for the transmissions with HARQ feedback enabled. In one example, the gNB simply does not increment the c-DAI and t-DAI fields in the scheduling DCI for the transmissions with HARQ feedback disabled.

The UE receives PDCCH in monitoring occasions, ignores both the c-DAI and t-DAI fields in the DCIs for the transmissions with HARQ feedback disabled, and determines the HARQ-ACK codebook size based only on the c-DAI and t-DAI fields in the scheduling DCIs for the transmissions with HARQ feedback enabled.

Figure 6:
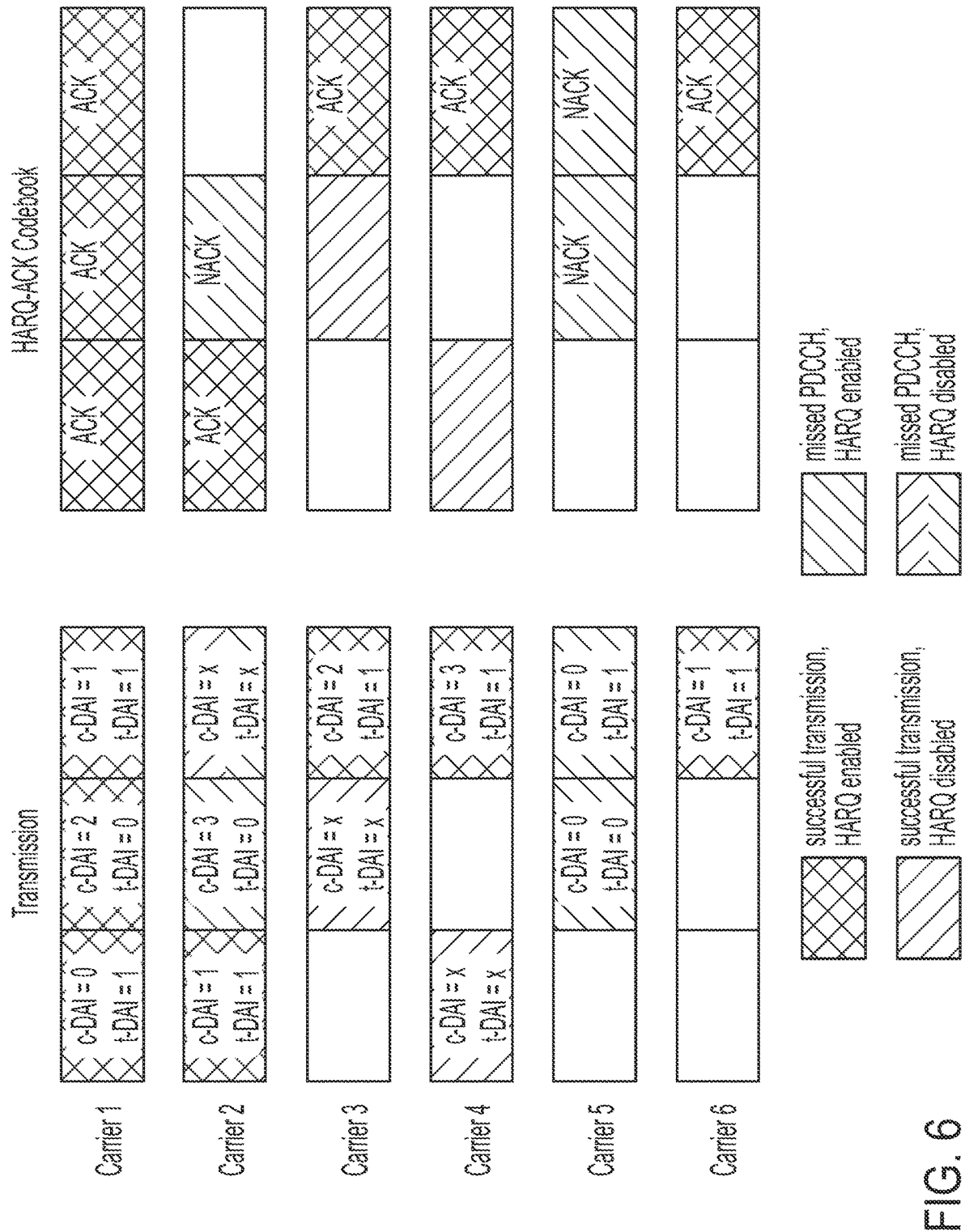
FIG. 6 is an illustration of downlink data transmissions and corresponding acknowledgment data, according to an embodiment of the present disclosure.

FIG. 6 shows an example with six carriers (serving cells). The UE is configured to report HARQ-ACK feedback for PDSCH reception in three slots across six carriers as shown. Thirteen PDSCH transmissions are scheduled, three of which have their HARQ processes disabled. Three scheduling PDCCHs for transmissions with HARQ feedback enabled are missed. Moreover, one scheduling PDCCH for a transmission with HARQ feedback disabled is missed. The UE inspects the c-DAI and t-DAI fields in the DCIs for the scheduling PDCCHs, and successfully determines the HARQ-ACK codebook size.

In some embodiments, the gNB may send, to the UE, Semi-Persistent Scheduling (SPS) downlink data transmissions (i.e., downlink data transmissions scheduled by SPS) with HARQ feedback disabled. Unlike DG PDSCHs for which an A/N codebook size mismatch between UE and gNB is possible, the A/N of the SPS PDSCHs is determined semi-statically based on the SPS PDSCH occasions without a possible mismatch between UE and gNB.

Once the UE determines the DG A/N codebook according to the (e.g., Type-2) HARQ-ACK codebook pseudo-code (e.g., the pseudo-code included in Clause 9.1.3.1 of Technical Specification 38.213 of Rel-16), it adds an SPS A/N codebook, to form (from the two codebooks) the HARQ-ACK codebook to be transmitted back to the gNB. The SPS A/N codebook includes an A/N for every possible SPS PDSCH occasion on every serving cell if the A/N of the SPS PDSCH is mapped to the same PUCCH slot/sub-slot as the DG A/N bits. The timing slot offset from the end of the SPS PDSCH to the PUCCH slot is given by the activation DCI of the corresponding SPS configuration. The UE determines the SPS A/N codebook by acknowledging all the cells, SPS configurations, and downlink slots in the following order: (i) serving cell index (ii) SPS configuration index, and (iii) downlink slot number.

Figure 7:
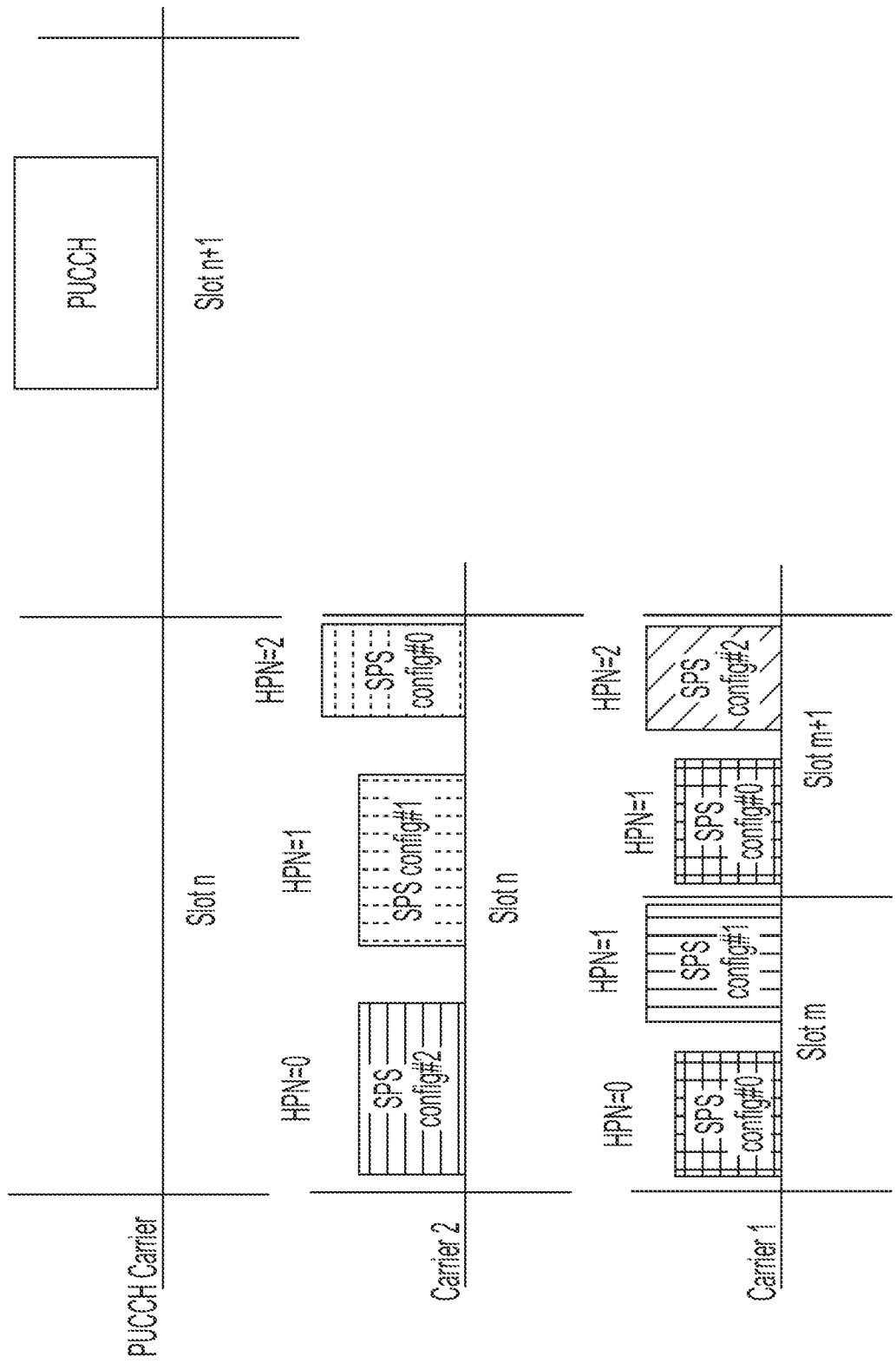
FIG. 7 is an illustration of downlink data transmissions and corresponding acknowledgment data, according to an embodiment of the present disclosure.

FIG. 7 shows SPS configurations on two different carriers, with the A/N of all the SPS PDSCHs mapped to the same PUCCH in slot n+1 with slot offset K_1=1. The UE determines the SPS A/N codebook as $a_1 a_2 a_3 a_4$ for carrier 1 and as $b_1 b_2 b_3$ for carrier 2. The final SPS A/N codebook is $a_1 a_2 a_3 a_4 b_1 b_2 b_3$, which is appended to the DG A/N codebook obtained by, for example the Type-2 codebook, to form the final HARQ-ACK codebook to be transmitted in the PUCCH.

The feedback for the HARQ process associated with the SPS PDSCH can be disabled by RRC configuration either per HARQ process or per SPS configuration. In some embodiments, the SPS A/N determination is made by skipping any SPS PDSCH occasion the HARQ process of which is disabled. Unlike DG PDSCH, the HARQ process number for SPS PDSCH is determined semi-statically from period to period; the HARQ Process Number (HPN) for a period is obtained by incrementing the HPN of the previous period. As an example, if SPS configuration #0 is of periodicity of 1 slot and the HARQ process number of SPS PDSCH with configuration #0 in slot m is 0, then the HARQ process number of the SPS PDSCH with configuration #0 in slot m+1 is 1, in slot m+2 the HARQ process number is 2, and so on. As such, every SPS PDSCH occasions is uniquely associated with a HARQ process number, and the UE will know whether or not to include the A/N for a given SPS PDSCH occasion.

As an example, if the HPNs of the SPS configurations are as shown in FIG. 7, and HARQ feedback is disabled per HARQ process for HPN=1, the UE will determine the SPS A/N codebook as $a_1 a_4 b_1 b_3$ and append it to the end of the DG A/N codebook to obtain the final HARQ-ACK codebook. In another example, if the HPNs of the SPS configurations are as shown in FIG. 7, and HARQ feedback is disabled per SPS configuration for SPS configuration #1, then the UE will determine the SPS A/N codebook as $a_1 a_2 a_4 b_1 b_3$ and append it to the end of DG A/N codebook to obtain the final HARQ-ACK codebook.

When a Type-3 codebook is employed for DG transmissions, HARQ processes with HARQ-ACK disabled may be omitted from the codebook. The Type-3 HARQ-ACK codebook is provided in one-shot manner. If a UE is provided with pdsch-HARQ-ACK-OneShotFeedback-r16, the UE determines a Type-3 codebook by having acknowledgement bits for all serving cells, HARQ processes, Transport Blocks, and Code Block Groups in the following order: (i) serving cell index, (ii) HARQ process number, (iii) TB index, and (iv) CBG index. The UE transmits positive acknowledgment (ACK) for all successful transmissions and negative acknowledgment (NACK) for all failed or missed transmissions.

In some embodiments, to reduce unnecessary overhead, acknowledgment information is included in the Type-3 codebook only for those HARQ processes that are enabled, and acknowledgment information for HARQ processes that are disabled is excluded from the HARQ-ACK codebook. This allows for an optimized codebook size that does not vary dynamically.

Clause 9.1.4 of Technical Specification 38.213 of Rel-16 provides a codebook determination algorithm for Type-3 HARQ-ACK. In the algorithm under different conditions in several positions, the HARQ-ACK codebook entry j, i.e., $\tilde{o}_j^{ACK}$, is populated by the acknowledgment information bit for the corresponding transport block or code block group, or possibly by a New Data Indicator (NDI) value indicated in the DCI format. To exclude the HARQ processes that are disabled from the HARQ-ACK codebook, in the existing algorithm, everywhere of $\tilde{o}_j^{ACK}$ is populated, it may be populated conditionally, e.g., only for HARQ processes that are enabled.

In Rel-15 and in Rel-16, blind PDSCH (re)transmission for a given HARQ process number (HPN) is not supported. In other words, for a given HPN, the gNB may not reschedule the UE with a (re)transmission of a PDSCH until it has received the A/N response of the previously transmitted PDSCH (or until the latest time at which it could have expected to receive this A/N response has passed). The following excerpt from Technical Specification 38.214 of Rel-16 defines this behavior: "The UE is not expected to receive another PDSCH for a given HARQ process until after the end of the expected transmission of HARQ-ACK for that HARQ process, where the timing is given by Clause 9.2.3 of [6, TS 38.213]". When the gNB configures the UE via RRC to disable A/N transmission for a specific HPN, there will not be any A/N transmission for the PDSCH of the HPN. In that case, the above-specified behavior may be modified to allow PDSCH (re)transmission without the need for A/N transmission. As used herein, a "retransmission" of a first downlink data transmission is a transmission that is based on the same raw data (e.g., a retransmission may include the same raw data encoded differently, e.g., the first downlink data transmission may be a portion of a circular buffer, the circular buffer containing encoded raw data, and the retransmission may be a different portion of the same circular buffer).

For example, the UE may behave as follows. If the A/N transmission for the PDSCHs of the HARQ process is enabled, the UE is not expected to receive another PDSCH for the HARQ process until after the end of the expected transmission of the A/N of that HARQ process. If the A/N transmission for the PDSCHs of the HARQ process is disabled, the UE is expected to receive one or more (re)transmission of the PDSCHs of the HRAQ process without any A/N transmission for the PDSCHs. As such, the specified behavior of the UE may be modified to read "When HARQ-ACK feedback for the HARQ process ID is not disabled, the UE is not expected to receive another PDSCH for a given HARQ process until after the end of the expected transmission of HARQ-ACK for that HARQ process, where the timing is given by Clause 9.2.3 of [6, TS 38.213]".

Figure 8:
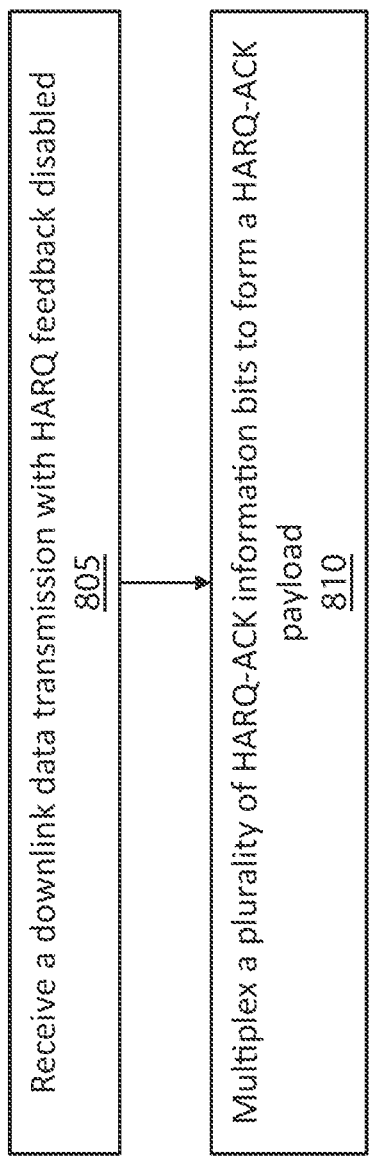
FIG. 8 is a flowchart, according to an embodiment of the present disclosure.
Figure 9:
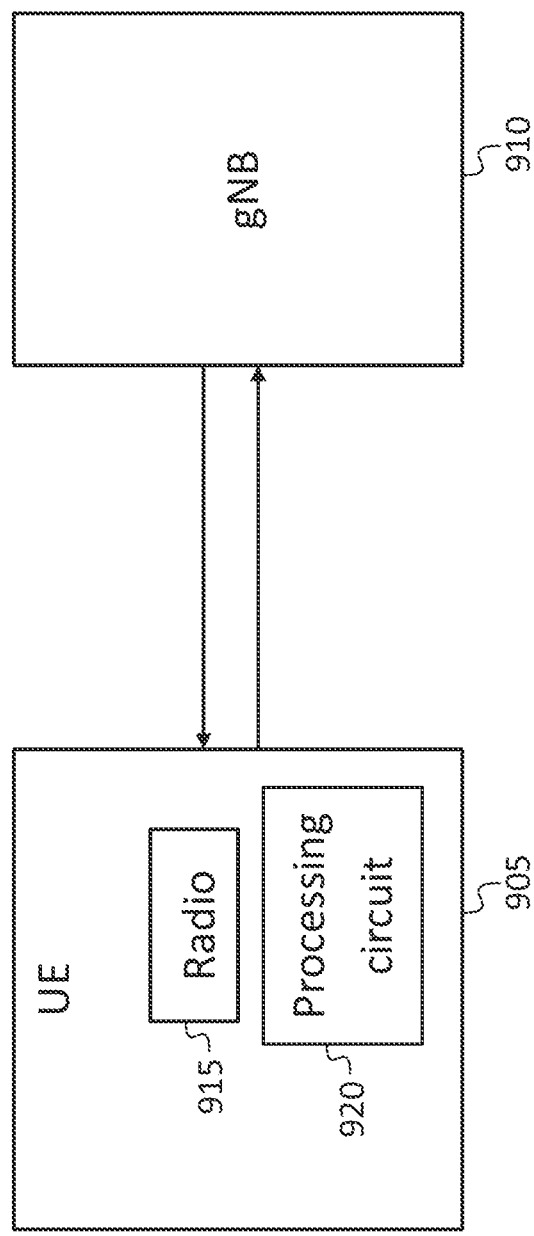
FIG. 9 is a block diagram of a system for wireless communications, according to an embodiment of the present disclosure.

FIG. 8 shows a flowchart of a method. In some embodiments, the method includes, receiving, at 805, by a UE, a downlink data transmission with HARQ feedback disabled, and, at 810, multiplexing, by the UE, a plurality of HARQ-ACK information bits to form a HARQ-ACK codebook. In some embodiments, the multiplexing of the plurality of HARQ-ACK information bits does not include multiplexing a HARQ-ACK information bit for the downlink data transmission in the HARQ-ACK codebook. FIG. 9 shows a system including a UE 905 and a gNB 910, in communication with each other. The UE may include a radio 915 and a processing circuit (or a means for processing) 920, which may perform various methods disclosed herein, e.g., the method illustrated in FIG. 8. For example, the processing circuit 920 may receive, via the radio 915, transmissions from the network node (gNB) 910, and the processing circuit 920 may transmit, via the radio 915, signals to the gNB 910.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of a system and method for managing downlink data transmissions with HARQ feedback disabled have been specifically described and illustrated herein, many modifications and variations will be apparent to those skilled in the art. Accordingly, it is to be understood that a system and method for managing downlink data transmissions with HARQ feedback disabled constructed according to principles of this disclosure may be embodied other than as specifically described herein. The invention is also defined in the following claims, and equivalents thereof.

What is claimed is:

1. A method, comprising:
receiving, by a User Equipment (UE), a downlink data transmission with Hybrid Automatic Repeat reQuest (HARQ) feedback disabled; and
multiplexing, by the UE, a plurality of HARQ-acknowledgment (HARQ-ACK) information bits to form a HARQ-ACK codebook,
wherein the multiplexing of the HARQ-ACK information bits does not include multiplexing a HARQ-ACK information bit for the downlink data transmission in the HARQ-ACK codebook, and
wherein the downlink data transmission is scheduled by semi-persistent scheduling (SPS) indicating that the HARQ feedback is disabled for a first SPS occasion and for a second SPS occasion based on the first SPS occasion and the second SPS occasion being associated with a first HARQ process number.

2. The method of claim 1, wherein:
the HARQ-ACK codebook includes a Type-3 HARQ-ACK codebook;
the downlink data transmission is scheduled by Dynamic Grant (DG); and
the Type-3 HARQ-ACK codebook does not include a HARQ-ACK information bit corresponding to the downlink data transmission.

3. The method of claim 1, wherein:
the HARQ-ACK codebook includes a Type-2 HARQ-ACK codebook;
the downlink data transmission is scheduled by Dynamic Grant (DG); and
the Type-2 HARQ-ACK codebook does not include a HARQ-ACK information bit corresponding to the downlink data transmission.

4. The method of claim 3, further comprising receiving a Downlink Control Information (DCI) scheduling the downlink data transmission, wherein:
the DCI does not include a counter Downlink Assignment Indicator (c-DAI); and
the DCI does not include a total Downlink Assignment Indicator (t-DAI).

5. The method of claim 3, further comprising receiving a Downlink Control Information (DCI) scheduling the downlink data transmission,
wherein:
the DCI includes a counter Downlink Assignment Indicator (c-DAI); and
the DCI includes a total Downlink Assignment Indicator (t-DAI).

6. The method of claim 5, further comprising:
disregarding the c-DAI; and
determining a length of the Type-2 HARQ-ACK codebook based on the t-DAI.

7. The method of claim 5, further comprising determining a length of the Type-2 HARQ-ACK codebook based on the c-DAI and based on the t-DAI.

8. The method of claim 5, further comprising:
disregarding the c-DAI; and
disregarding the t-DAI.

9. The method of claim 3, further comprising receiving a Downlink Control Information (DCI) scheduling the downlink data transmission, wherein:
the DCI lacks at least one of:
a Physical Uplink Control Channel (PUCCH) resource indicator field,
a Physical Downlink Shared Channel (PDSCH) to HARQ feedback timing indicator field,
a Code Block Group Transmission Information (CBGTI) field,
a Code Block Group Flushing out Information (CBGFI) field,
a Physical Uplink Shared Channel (PUSCH)-to-HARQ feedback timing field,
a counter Downlink Assignment Indicator (c-DAI) field, and
a Transmit Power Control (TPC) command field.

10. The method of claim 1, further comprising receiving a retransmission of the downlink data transmission.

11. A User Equipment (UE), comprising:
a radio; and
a processing circuit,
the processing circuit being configured to:
receive a downlink data transmission with Hybrid Automatic Repeat reQuest (HARQ) feedback disabled; and
multiplex a plurality of HARQ-acknowledgment (HARQ-ACK) information bits to form a HARQ-ACK codebook,
wherein the multiplexing of the plurality of HARQ-ACK information bits does not include multiplexing a HARQ-ACK information bit for the downlink data transmission in the HARQ-ACK codebook, and
wherein the downlink data transmission is scheduled by semi-persistent scheduling (SPS) indicating that the HARQ feedback is disabled for a first SPS occasion and for a second SPS occasion based on the first SPS occasion and the second SPS occasion being associated with a first HARQ process number.

12. The UE of claim 11, wherein:
the HARQ-ACK codebook includes a Type-3 HARQ-ACK codebook;
the downlink data transmission is scheduled by Dynamic Grant (DG); and
the Type-3 HARQ-ACK codebook does not include a HARQ-ACK information bit corresponding to the downlink data transmission.

13. The UE of claim 11, wherein:
the HARQ-ACK codebook includes a Type-2 HARQ-ACK codebook;
the downlink data transmission is scheduled by Dynamic Grant (DG); and
the Type-2 HARQ-ACK codebook does not include a HARQ-ACK information bit corresponding to the downlink data transmission.

14. The UE of claim 13, wherein the processing circuit is further configured to receive a Downlink Control Information (DCI) scheduling the downlink data transmission, wherein:
the DCI does not include a counter Downlink Assignment Indicator (c-DAI); and
the DCI does not include a total Downlink Assignment Indicator (t-DAI).

15. The UE of claim 13, wherein the processing circuit is further configured to receive a Downlink Control Information (DCI) scheduling the downlink data transmission, wherein:

the DCI includes a counter Downlink Assignment Indicator (c-DAI); and the DCI includes a total Downlink Assignment Indicator (t-DAI).

16. The UE of claim 15, wherein the processing circuit is further configured to:

disregard the c-DAI; and determine a length of the Type-2 HARQ-ACK codebook based on the t-DAI.

17. The UE of claim 15, wherein the processing circuit is further configured to determine a length of the Type-2 HARQ-ACK codebook based on the c-DAI and based on the t-DAI.

18. A User Equipment (UE), comprising:
a radio; and
means for processing,
the means for processing being configured to:
   receive a downlink data transmission with Hybrid Automatic Repeat reQuest (HARQ) feedback disabled; and
   multiplex a plurality of HARQ-acknowledgment (HARQ-ACK) information bits to form a HARQ-ACK codebook,
wherein the multiplexing of the plurality of HARQ-ACK information bits does not include multiplexing a HARQ-ACK information bit for the downlink data transmission in the HARQ-ACK codebook, and
wherein the downlink data transmission is scheduled by semi-persistent scheduling (SPS) indicating that the HARQ feedback is disabled for a first SPS occasion and for a second SPS occasion based on the first SPS occasion and the second SPS occasion being associated with a first HARQ process number.

* * * * *